(12) United States Patent
Abrams (10) Patent No.: US 8,485,380 B1
(45) Date of Patent: Jul. 16, 2013

(54) CONTAINER RECLOSURE DEVICE HAVING A FLEXIBLE BAND

(76) Inventor: Kenneth A. Abrams, Silver Spring, MD (US)

( * ) Notice: Subject to any disclaimer, the term of this patent is extended or adjusted under 35 U.S.C. 154(b) by 795 days.

(21) Appl. No.: 12/535,190

(22) Filed: Aug. 4, 2009

Related U.S. Application Data (60) Provisional application No. 61/086,322, filed on Aug. 5, 2008.

(51) Int. Cl.
*B65D 51/00* (2006.01)
*B32B 3/26* (2006.01)
*B32B 33/00* (2006.01)

(52) U.S. Cl.
USPC ........ 220/212; 220/200; 428/41.8; 428/321.5

(58) Field of Classification Search
USPC .................. 24/304, 17 B, DIG. 11; 428/40.2, 428/40.1, 41.8, 321.5; 383/84, 86; 229/67.4, 229/80.5; 220/200, 359.1, 359.3
See application file for complete search history.

(56) References Cited

U.S. PATENT DOCUMENTS

| | | | |
|---|---|---|---|
| 424,411 A | 3/1890 | Fielder | |
| 2,907,682 A | 10/1959 | Eichel | |
| 2,980,941 A * | 4/1961 | Miller | ........................ 15/104.93 |
| 3,412,926 A | 11/1968 | Bostwick | |
| 3,889,872 A | 6/1975 | Lin | |
| 3,906,941 A | 9/1975 | Cook, Jr. | |
| 4,543,139 A * | 9/1985 | Freedman et al. | ............ 156/152 |
| 5,267,374 A | 12/1993 | Drake | |
| 5,347,671 A | 9/1994 | Hunts | |
| 5,855,434 A * | 1/1999 | Hagen | ............................. 383/89 |
| 7,425,360 B2 | 9/2008 | Line et al. | |
| 7,426,994 B2 | 9/2008 | Simmons | |

* cited by examiner

*Primary Examiner* — Robin Hylton
(74) *Attorney, Agent, or Firm* — Roylance, Abrams, Berdo & Goodman, L.L.P.

(57) ABSTRACT

An attachable closure device for reclosing contains a base member, a resilient expandable band coupled to and extending from the base member, an adhesive layer on a surface of the base member, and a release agent on the adhesive layer. The release agent is housed in a coating on a release support layer, which may be coupled to the base member and unitary with the base member. The resilient, expandable band may be coupled and retained to the attachable closure device solely by a portion of the unitary base member-release support layer.

7 Claims, 11 Drawing Sheets

CONTAINER RECLOSURE DEVICE HAVING A FLEXIBLE BAND

CROSS-REFERENCE TO RELATED APPLICATION

This application claims the benefit of U.S. provisional application Ser. No. 61/086,322 filed Aug. 5, 2008, the entire disclosure of which is hereby incorporated by reference.

FIELD OF THE INVENTION

The present invention generally relates to a reclosure apparatus. More specifically, the invention relates to a reclosure apparatus with means of attachment and more particularly to an apparatus for securing a receptacle such as a flexible or non-flexible container, including (but not limited to) a plastic snack bag or the like to prevent the contents of the bag from falling out during storage and to extend the freshness life of any perishable contents within the container. The reclosure apparatus may also include a hand/skin sanitizing agent.

BACKGROUND OF THE INVENTION

The packaging of material and products in flexible bags, boxes, cartons and the like has long been considered a practical and efficient method of packaging. Various devices have been utilized for temporarily resealing packages between use. However, such devices still have many drawbacks.

Reclosure devices, in general, are in two different categories. The first category is the pre-attached/built-in closures that are constructed into or onto the package during their manufacture and prior to the sale of the product. Another category involves a "separate" closure device, which is utilized by the consumer after the purchase of the product and sold as a separate unit. Tongue and groove structure and sticky tape type closures are two examples of the former. The butterfly clip and twist tie closures are two examples of the latter. Both types of closures possess advantageous features, but also have various shortcomings which are overcome by the present invention.

Virtually everyone, for example, has experienced the pre-attached closure device that is almost impossible to manipulate or more often then not destroyed upon the opening of the package, rendering it useless. Moreover, it is widely recognized that the materials being used in bag construction have the additionally frustrating characteristic of a highly developed "memory" that virtually defies remaining in a rolled up condition between uses so that the contents are kept away from exposure to air. In short, a growing problem exists where, if one is able to successfully open a bag without damaging the reclosure device the bag won't stay rolled up tight enough to keep the air out and the contents fresh for very long. Another problem is that many packages do not come with "built in" closure devices at all, either, due to the additional cost such device would add to the product. Likewise, the size of the package can often times be a deciding factor against adding a closure, as in the case of a snack size chip bag. Therefore, a drawback consistent with pre-attached closures is that they limit the consumer to utilization of the advantages of a "built on closure" to packages that a manufacturer has deemed worthy of having such a device.

Another type of reclosure device include the various types of detached or separate closures that are purchased and applied to the package by the user. These types of closures are: easy to lose; bulky; permit excess air in the package; not practical on small bags (butterfly clips); don't work on boxes (butterfly clips, twist ties); expensive (butterfly clips); and are not easily disposable (butterfly clips). Additionally, reclosure devices, such as rubber bands and twist ties are dangerous as they can be swallowed by small children. Likewise, rubber bands can easily get tangled making it hard to retrieve only one when needed. Additionally, rubber bands can be easily lost prior to reclosure and while consuming the packaged foodstuff.

SUMMARY OF THE INVENTION

An attachable closure device has been discovered comprising a base member, a resilient expandable band coupled to and extending from the base member, an adhesive layer on a surface of the base member, and a release agent on the adhesive layer.

Additionally, the attachable closure device of the present invention provides the release agent in a coating on a release support layer, which release support layer may be coupled to the base member. Further, the release support layer can be unitary with the base member. The resilient, expandable band may be coupled and retained to the attachable closure device solely by a portion of said unitary base member-release support layer. The adhesive layer may be provided as a continuous or as at least two discontinuous portions on the surface of the base member.

According to another embodiment of the invention, the base member of the present attachable closure device may be coupled to a liquid sanitizing member comprising releasable liquid sanitizing agent. The liquid sanitizing agent can be released from said liquid sanitizing member upon separation of the adhesive layer from said release agent.

According to a further embodiment of the invention, a single release sheet may be provided with multiple detachable base members each of which is coupled to a resilient expansible band, such that the base member can be peeled off of the sheet and used as needed. If desired, a surface of the release support layer may contain visible printed matter on a surface opposite the release agent so as to provide advertising or instructive matter, for example.

Thus, the present invention may comprise an endless elastic or elastomeric band affixed to a tab. The tab comprises a base layer bearing an adhesive element that when exposed can be permanently or temporarily affixed to the container, which is hereinafter referred to as a "bag" for convenience purposes, thereby attaching the reclosure apparatus to the bag. The tab can also serve the purpose of housing the elastomeric band prior to use. The tab can also be utilized for logo and/or advertising space. Additionally, the tab can also be utilized to house a sanitizing element to be used by the consumer, if desired.

An object of the present invention is to provide a bag reclosure device that will overcome the shortcomings of prior art devices. Also, the present device may incorporate a skin sanitizing agent.

Other objects, advantages and salient features of the present invention will become apparent from the following detailed description, which, taken in conjunction with the annexed drawings, discloses preferred embodiments of the present invention.

DETAILED DESCRIPTION OF THE INVENTION

Figure 1:
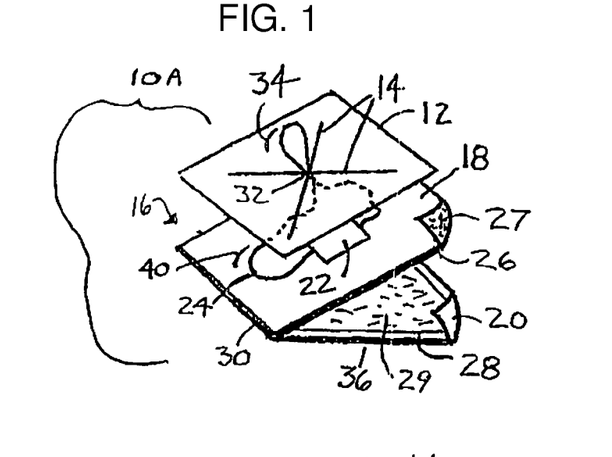
FIG. 1 is an exploded perspective view showing various layers of a package reclosure device in accordance with a first embodiment of the invention.
Figure 3A:
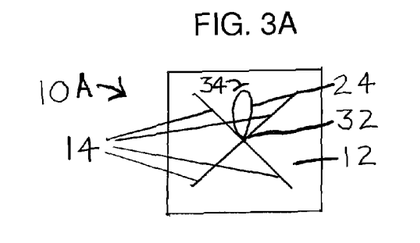
FIG. 3A is a top plan view of the package reclosure device of FIG. 2A.

Referring now to FIG. 1, an embodiment of a package reclosure 10A is shown. The reclosure apparatus 10A comprises a top layer 12 comprising perforations 14 (also shown in FIGS. 3A and 3B) that may be broken in a manner described later herein. It should also be noted that top layer 12 has an opening 32, for protrusion or exposure of a portion of the elastomeric band 24. The elastomeric band 24 can be completely concealed beneath opening 32 before use as illustrated in FIG. 4D.

The reclosure apparatus may comprises a folded carrier substrate, such as member 16 having a first outer side or surface 18, a second outer side or surface 20, a first inward side or surface 26, and a second inward side or surface 28. The folded carrier substrate 16 has a single fold 30 in the embodiment shown in FIG. 1. However, it should be appreciated that the reclosure device 10A may be formed from a single substrate having two folds, such that taken together top layer 12 and second layer 18 may form a second fold (not shown). As illustrated, for example, in FIGS. 1, 2A and 2B, the first inward side or surface 26 has an adhesive layer 27 secured thereto. The second inward side or surface 28 receives a release liner 29. The various supporting sheets or layers described herein can be formed from paper or synthetic paper substitutes, which materials are well known in the art.

Figure 2A:
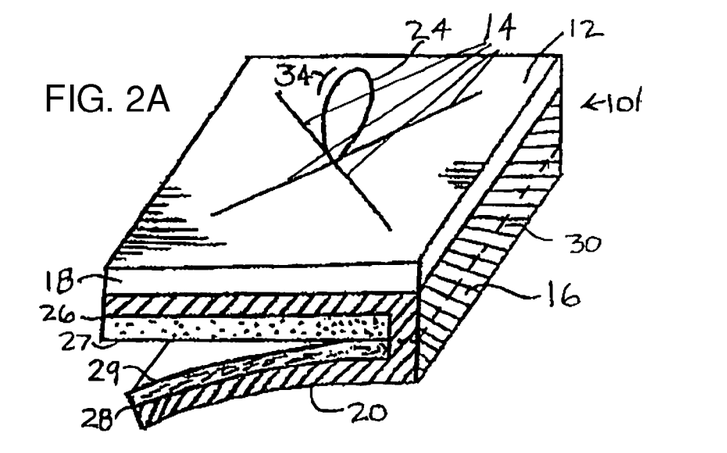
FIG. 2A is a perspective view in section showing various layers of a package reclosure device with release liner partially detached in accordance with the first embodiment of the invention.
Figure 2B:
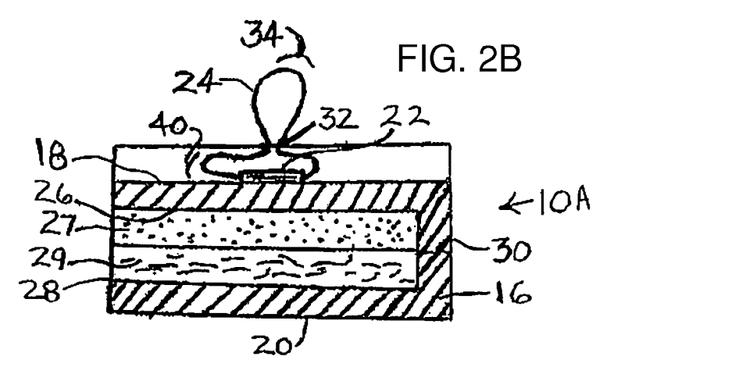
FIG. 2B is a side elevational view of FIG. 2A of the package reclosure apparatus showing various layers of the reclosure device in accordance with one embodiment of the invention.
Figure 3B:
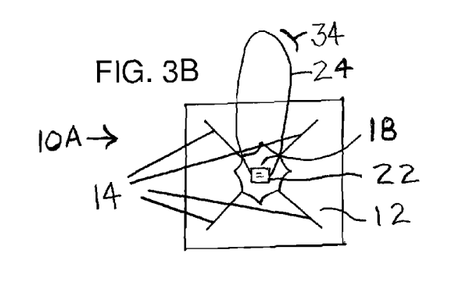
FIG. 3B is a top plan view of the package reclosure device of FIG. 2A showing an elastomeric band partially dislodged from the perforated closure.

As shown in FIGS. 1, 2B and 3B, the first outer side or surface 18 has a permanent fastener 22 for elastomeric band 24. The major portion of elastomeric band 34 is temporarily housed between top layer 12 and first inward side or surface 26 by permanent attachment of fastener 22 to surface 18. FIGS. 1, 2A, 2B and 3A show the partial protrusion 34 of the elastomeric band 24 through the opening 32 on top layer 12.

FIGS. 4A, 5B, 5C and 5D illustrate how the second outer side or surface 20 may be utilized for an advertisement or logo imprint 36.

Figure 4A:
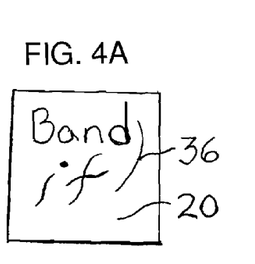
FIG. 4A is a bottom plan view of the package reclosure device of FIG. 2A illustrating the imprint of a company logo on the bottom surface.
Figure 4B:
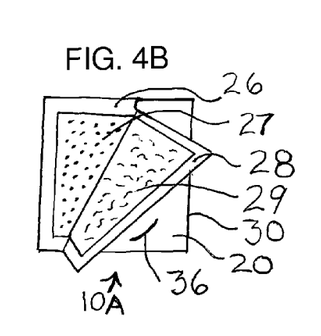
FIG. 4B is a bottom plan view of the package reclosure apparatus of FIG. 2A showing the release liner partially detached.
Figure 4C:
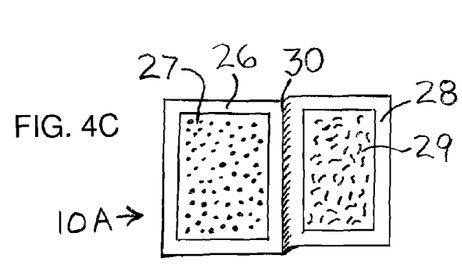
FIG. 4C is a bottom plan view of the package reclosure device of FIG. 2A showing the release liner exposing the pressure sensitive adhesive area completely.
Figure 4D:
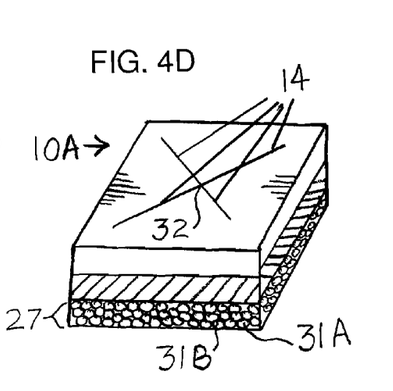
FIG. 4D is a perspective view in section showing various layers of the reclosure device in accordance with a second embodiment of the invention.
Figure 5A:
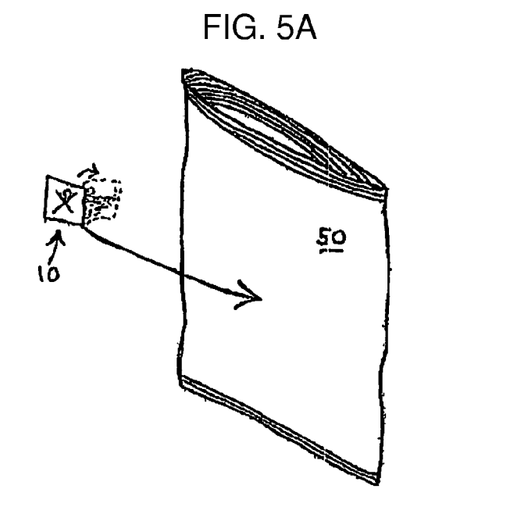
FIGS. 5A-5D illustrate use of the reclosure apparatus shown in FIGS. 1, 2A, 2B, 3A, 3B, 4A, 4B and 4C in order to attach to and release the package, with company logo capability also demonstrated in accordance with one embodiment of the invention.
Figure 5B:
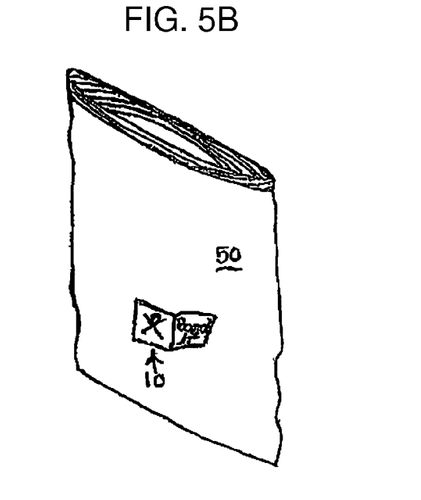
Figure 5C:
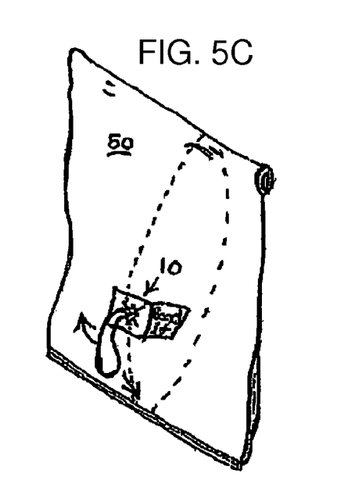
Figure 5D:
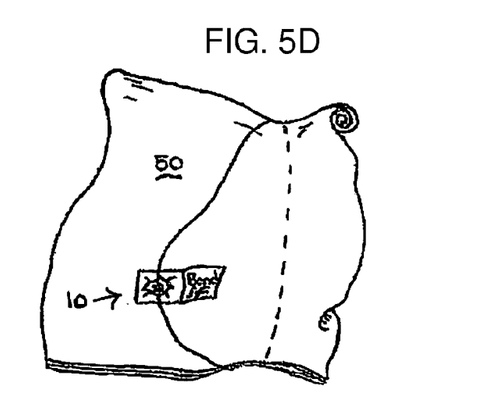

FIG. 2A illustrates a completely assembled view of an embodiment of the invention illustrating the various components and layers in a fully assembled form. To begin attachment of closure apparatus 10A to a bag or other container, the second outer layer 20 bearing release liner 29 is peeled or pivoted in the direction of hinge 30 exposing adhesive layer 27, as shown in FIGS. A and 4B. Once adhesive layer 27 is fully exposed as shown in FIG. 4C, closure apparatus 10 is applied by pressing adhesive layer 27 to package 50 as illustrated in FIG. 5A. FIGS. 5B-5D illustrate one possible positioning of closure apparatus 10 to the lower half of bag 50. Positioning closure apparatus 10 on the lower half of the bag will allow the user to roll up more of the package while leaving the closure apparatus exposed for proper storage as demonstrated in FIG. 5D.

Adhesive layer 27 may be formed from a pressure-sensitive adhesive. Such adhesives are well known in the label art include, for example, "pressure sensitive" or "tacky" adhesives which form a strong bond with the desired container substrate when separated from the release sheet. Alternatively, as illustrated in FIG. 4D, an adhesive-forming layer 27 may comprise a coating of interspersed pressure-rupturable microcapsules of two kinds. One kind of the microcapsules 31A encloses a liquid solvent, while the other kind of microcapsules 31B enclose a very viscous, nonflowing adhesive material which is substantially solid, but which is soluble in the solvent carried by the first kind of microcapsules. Under applied pressure from the top side of the reclosure device, the microcapsules are ruptured allowing the solvent to come into contact with the adhesive and become tacky thereby enabling the adhesive to form a bond with the container surface. Such a system is shown, for example, in U.S. Pat. No. 2,907,682 to Eichel, the disclosure of which is hereby incorporated by reference in its entirety.

The term "release agent" as used herein includes conventional materials used in conjunction with pressure-sensitive or tacky adhesives to enable easy separation of the adhesive-bearing substrate prior to application and bonding to the container. However, the term "release agent" as used herein may also include pressure-rupturable microcapsules containing adhesives or adhesive-forming precursors, which microcapsular walls likewise prevent adhesion to an undesired substrate prior to use. The various layers of the present device can be made of paper, plastic or any suitable sheet material, as desired.

Figure 4E:
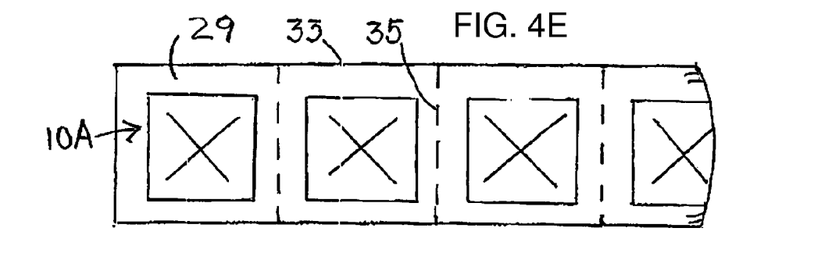
FIG. 4E is a partial top plan view showing multiple reclosure devices on a roll of release liner in accordance with an embodiment of the invention.

Release liner 29 may take the form of a sheet 33 which may be in the form of a roll having multiple closures devices 10A spaced apart and separated by perforations 35 which can be used to tear one individual closure 10A device from the continuous roll 33 as illustrated in FIG. 4E.

Figure 6A:
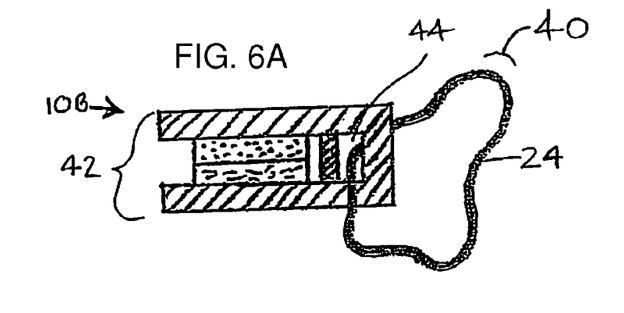
FIG. 6A is a side elevational view in section illustrating an assembled reclosure in accordance with a third embodiment of the invention.
Figure 6B:
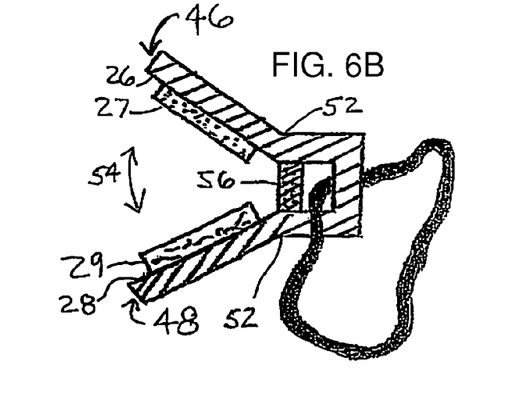
FIG. 6B is a side elevational view in section of the device of FIG. 6A with the release liner detached.
Figure 7A:
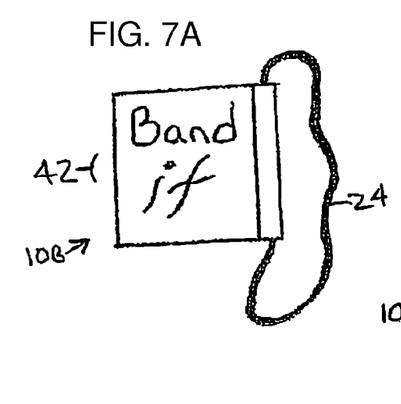
FIG. 7A is a top view of the device of FIG. 6A.
Figure 7B:
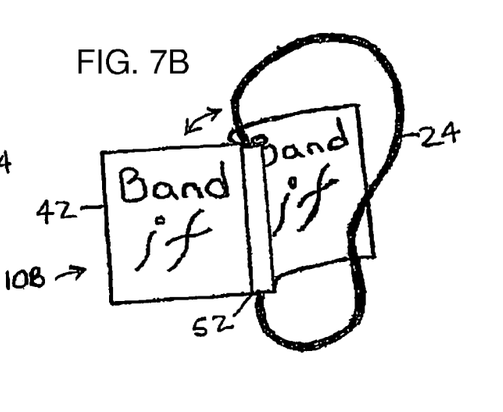
FIG. 7B is a perspective view of the package reclosure apparatus of FIG. 6A with the release liner detached.
Figure 7C:
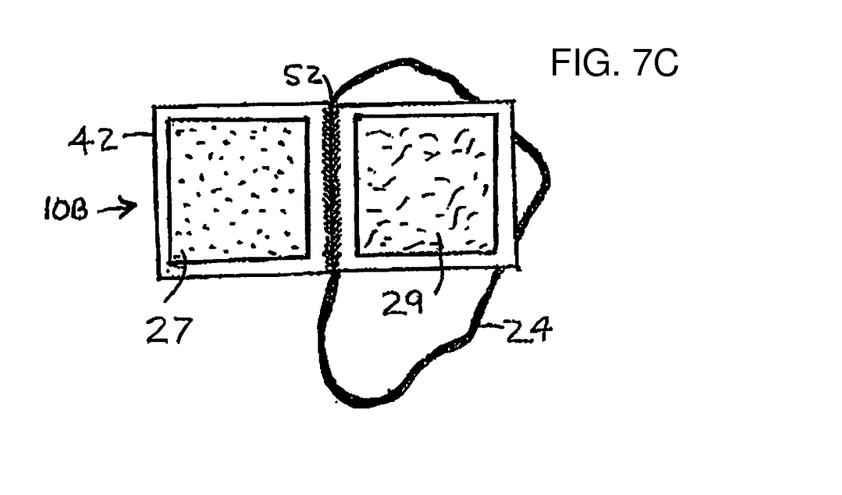
FIG. 7C is a bottom view of the device of FIG. 6A with the release liner separated form the adhesive layer.
Figures 8, 9:
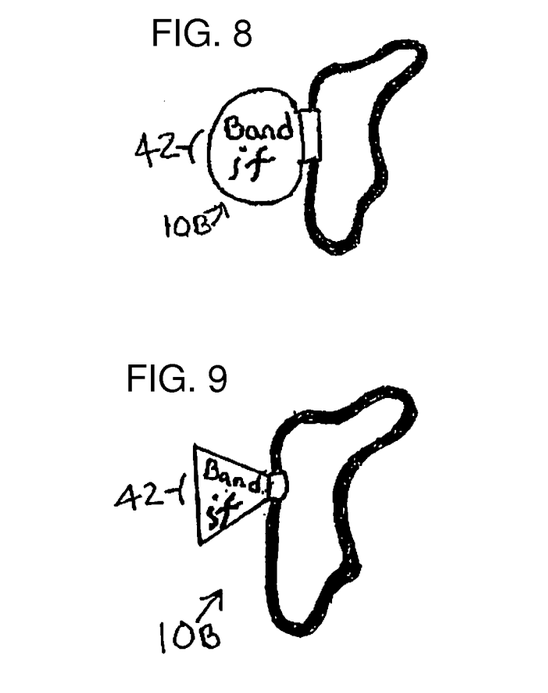
FIGS. 8 and 9 are top views of package reclosure devices having different shapes.

FIG. 6A illustrates a completely assembled view of an embodiment of the invention 10B illustrating the various components and layers in a fully assembled form. It should be appreciated that in embodiment of reclosure apparatus 10B, the majority of the elastomeric band 40 is exposed and loops through hole 44 providing permanent attachment of band 24 to tab 42. In this embodiment 6A the reclosure apparatus 10B comprises a top layer 46 with an adhesive layer 27 secured to inward side 26. A bottom layer 48 has a release liner 29 secured to inward side 28. To begin attachment process of closure apparatus 10B to bag 50, the top layer 46 and bottom layer 48 are detached at the open end 54 of tab 42 in opposing directions pivoting at hinges 52 on closed or attached end 56 of said tab 42 thereby exposing adhesive 27 for attachment. This is best illustrated in FIGS. 6B, 7B and 7C. Once adhesive layer 27 is exposed completely as illustrated in FIG. 7C said reclosure apparatus 10B is ready for attachment to bag 50.

Attachment and application of reclosure apparatus 10B follows the same attachment procedure as illustrated in FIGS. 5A-5D. It should be appreciated that said tab 42 can be constructed in a variety of geometric shapes and sizes as illustrated in FIGS. 7A, 8, 9 and 10A.

Figure 10A:
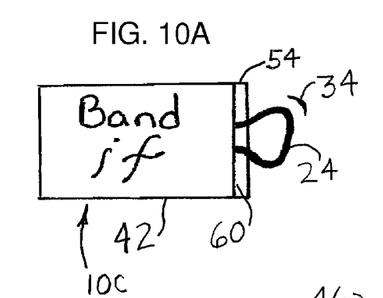
FIG. 10A is a top plan view of a package reclosure apparatus in accordance with a fourth embodiment of the invention.
Figure 10B:
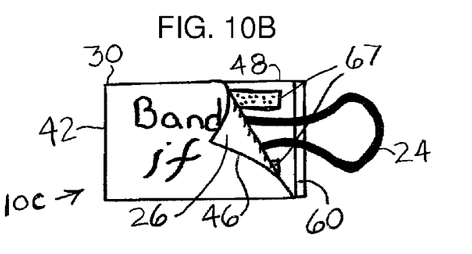
FIG. 10B is a top view of the package reclosure apparatus of FIG. 10A with the release liner partially detached.
Figure 10C:
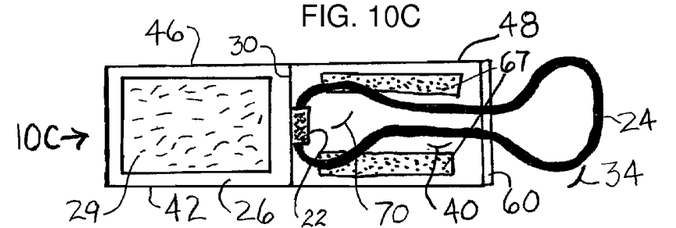
FIG. 10C is a bottom view of the package reclosure apparatus of FIG. 10A with the release liner fully detached exposing completely the pressure sensitive adhesive area in accordance with one embodiment of the invention.
Figure 10D:
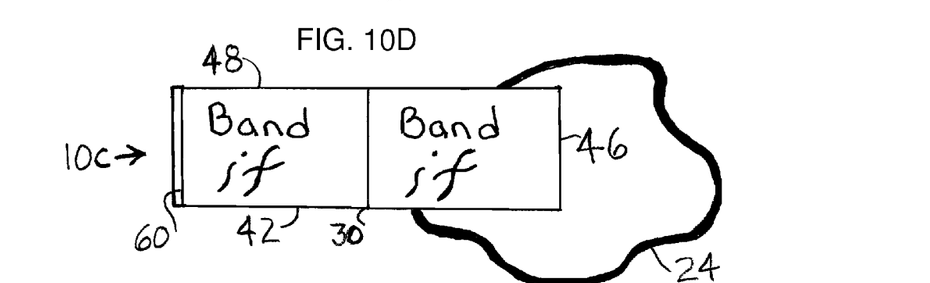
FIG. 10D is a perspective top view of the package reclosure apparatus with release liner fully separated from the release sheet.
Figure 11:
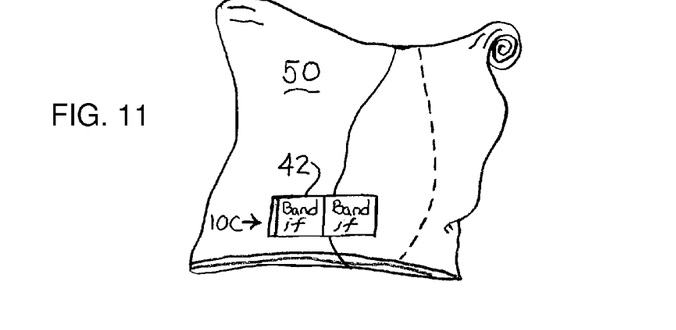
FIG. 11 shows use of the reclosure apparatus shown in FIGS. 10A-10D attached and used to reclose a package, with company logos.

FIG. 10A illustrates a completely assembled view of an embodiment of the invention. It should be appreciated that in embodiment of reclosure apparatus 10C a majority portion 40 of the elastomeric band 24 is temporarily housed between top layer 46 and bottom layer 48 of said tab 42 as best illustrated in FIGS. 10B and 10C. A partial protrusion 34 of band 24 is exposed as illustrated in FIG. 10A. It should be appreciated that the bottom layer 48 extends past top layer 46 with said extension 60 exposed, best illustrated in FIG. 10A. The elastomeric band 24 has permanent attachment to fastener 22 which is located near hinge 30 and between top layer 46 and bottom layer 48 of said tab 42 illustrated in FIG. 10C. It should be appreciated that top layer 46 receives a release liner 29 on top of inward side or surface 26 as shown in FIG. 10C. The inward side 28 of bottom layer 48 receives two adhesive strips 67 leaving an adhesive free area 70 so as not to interfere with housing of majority portion 40 of band 24 best illustrated in FIG. 10C. To begin attachment process of reclosure apparatus 10C to bag 50, the top layer 46 and bottom layer 48 are detached at the open end 54 of tab 42 in opposing directions pivoting at hinge 30 thereby exposing adhesive layer 27 for attachment. The process of opening said tab 42 is made easier by utilizing said extension 60. The opening process of said tab 42 is best illustrated in FIGS. 10B and 10C. Once adhesive layer 67 is exposed completely as illustrated in FIG. 10C, said reclosure apparatus 10C is ready for attachment to bag 50. Attachment and application of closure apparatus 10C is best illustrated in FIG. 11.

Figure 12A:
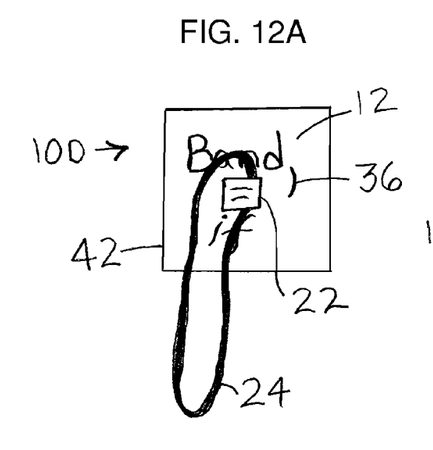
FIG. 12A is a top view of a fifth embodiment of the package reclosure device.
Figure 12B:
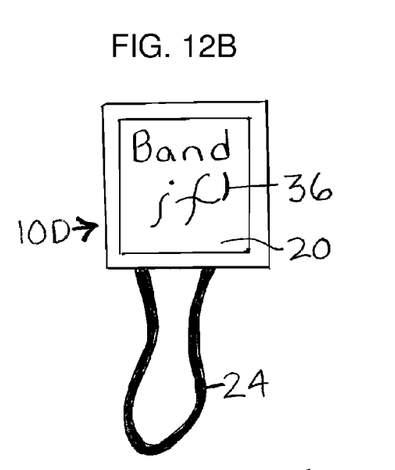
FIG. 12B is a bottom view of the package reclosure device of FIG. 12A.
Figure 12C:
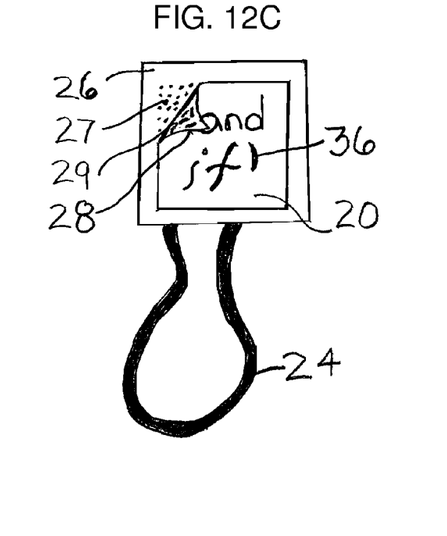
FIG. 12C is a perspective bottom view of the package reclosure apparatus of FIG. 12A with the release liner partially detached.
Figure 12D:
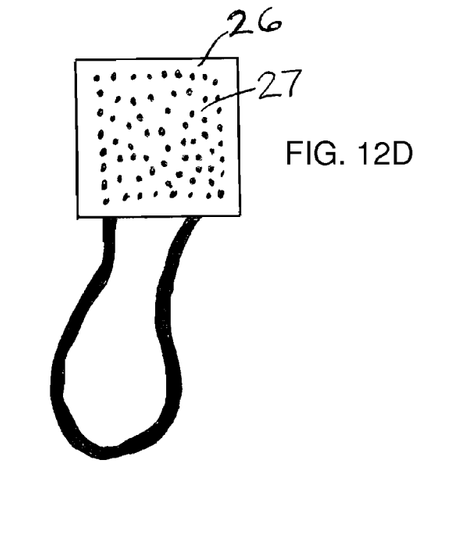
FIG. 12D is a perspective bottom view of the package reclosure apparatus of FIG. 12A with the pressure sensitive adhesive area exposed completely.

FIGS. 12A-12D illustrate yet another embodiment of the invention. It should be appreciated that in embodiment of reclosure apparatus 10D the elastomeric band 24 is exposed in totality best illustrated in FIG. 12A. The elastomeric band 24 has permanent attachment to fastener 22 which is located near the center of a top layer 12, as shown in FIG. 12A. The bottom outer surface 20 and or top surface 12 can be utilized for advertising or company logo imprint 36, best illustrated in FIGS. 12A, 12B and 12C. It should be appreciated that in embodiment 10D the bottom layer 20 is proportionally smaller then top layer 12 as illustrated in FIGS. 12B and 12C. The bottom layer 20 receives release liner 29 on the inward side 28 and top layer 12 receives an adhesive layer 27 on its inward side 26. To begin attachment process of reclosure apparatus 10D to bag 50, the top layer 12 and bottom layer 20 are detached completely. The process of separating the top layer 12 and bottom layer 20 is made easier because of the fact that the bottom layer 20 is smaller then top layer 12 giving the user greater ability to separate the two layers as shown in FIG. 12C. Once adhesive layer 27 is exposed completely as illustrated in FIG. 12D, said reclosure apparatus 10D is ready for attachment to bag 50. Attachment and application of reclosure apparatus 10D follows the same attachment procedure as illustrated in FIGS. 5A-5D.

Figure 13A:
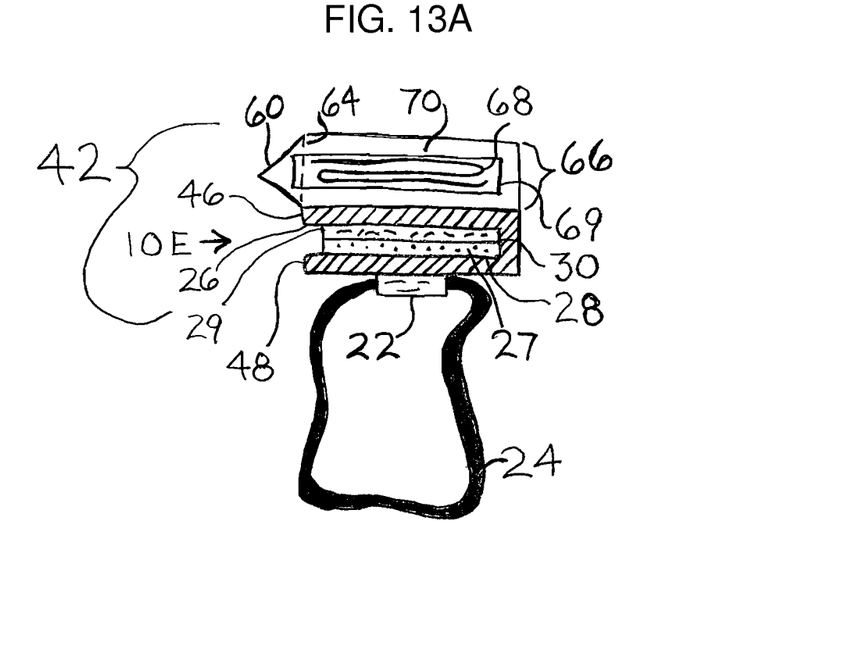
FIG. 13A is a side elevational view showing various layers of a sixth embodiment of the package reclosure apparatus in accordance with the invention.
Figure 13B:
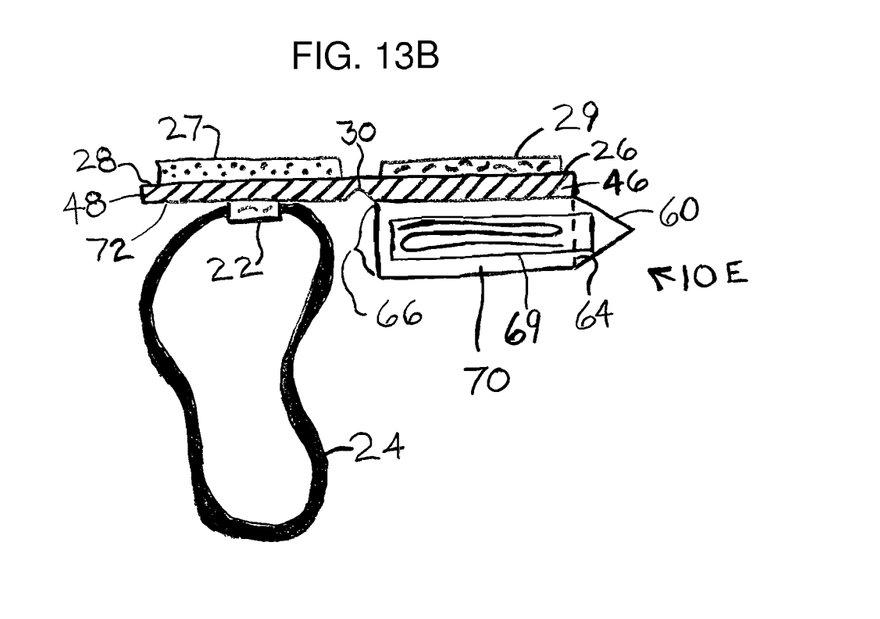
FIG. 13B is a side elevational view showing various layers of the package reclosure apparatus with release liner fully detached.
Figure 13C:
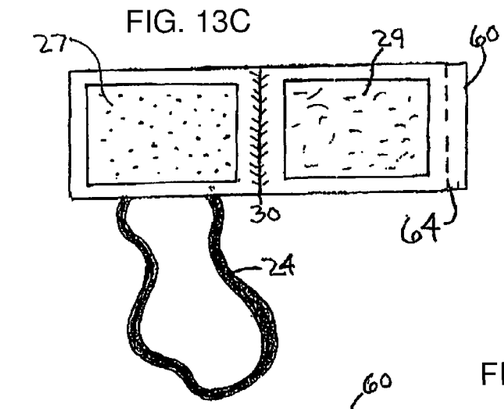
FIG. 13C is a bottom view of the package reclosure apparatus of FIG. 13B.
Figure 13D:
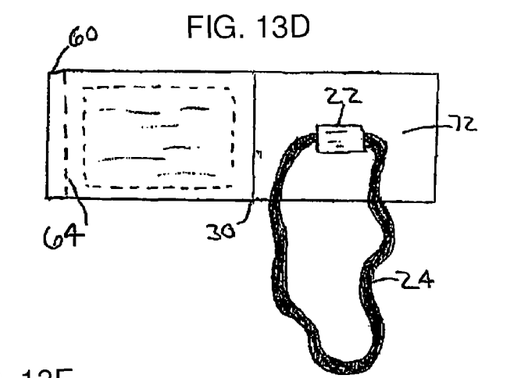
FIG. 13D is a top view of the package reclosure apparatus of FIG. 13B.
Figure 13E:
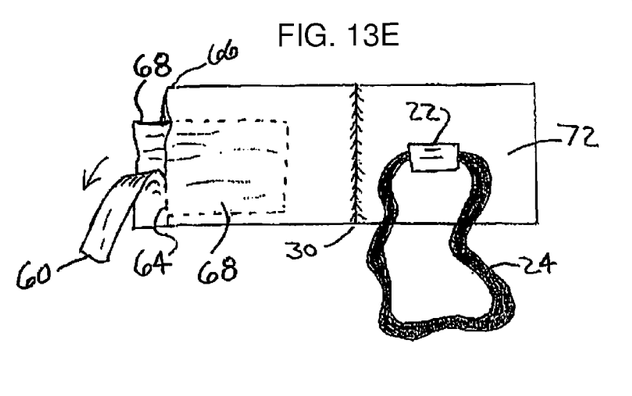
FIG. 13E is a top view of the package reclosure device of FIG. 13D showing partial exposure of a sanitizing moist towelette.

FIGS. 13A-13E illustrates yet another embodiment of the invention. Referring now to FIG. 13A, an embodiment of a package reclosure 10E is shown. The reclosure apparatus 10E comprises a sealed package 66 consisting essentially of an inner liquid and gas impervious tearable envelope 69 and a moistened narrow fold towelette applicator 68 (or a liquid sanitizing agent) enclosed within the envelope. The envelope 69 is contained within an outer sheet of paper or the like 70 as illustrated in FIGS. 13A and 13B. The sealed package 66 has a perforated tear away end 64 for retrieving said towelette 68 or other sanitizing agent as illustrated in FIG. 13E. It should be appreciated that sealed package 66 is attached to top layer 46 of said tab 42. It should be appreciated that top layer 46 receives a release liner 29 on top of inward side or surface 26 as shown in FIGS. 13A-13D. The bottom layer 48 receives an adhesive layer 27 on its inward side 28. It should be appreciated that in embodiment of reclosure apparatus 10E the elastomeric band 24 is exposed in totality, best illustrated in FIGS. 13A, 13B, 13D and 13E. The elastomeric band 24 has permanent attachment to fastener 22 which is located near the center of bottom layer 72, best illustrated in FIG. 13D and FIG. 13E. To begin attachment process of reclosure apparatus 10E to bag 50, the top layer 46 and bottom layer 48 are detached at the open end of tab 42 in opposing directions pivoting at hinge 30 thereby exposing adhesive layer 27 for attachment. The process of opening said tab 42 is made easier by utilizing said extension 60. The opening process is best illustrated in FIGS. 13B and 13C. Once adhesive layer 27 is exposed, the attachment and application of reclosure apparatus 10E follows the same procedure as illustrated in FIGS. 5A-5D. It should be appreciated that before or after said reclosure apparatus 10E has been attached to bag 50, a consumer may utilize said towelette 68 (or other sanitizing agent) by tearing the sealed package 66 at the line of perforations 64 on said package. It should be appreciated that the sealed package 66 may contain a multiple number of individual envelopes each containing a separate towelette 68 (or other sanitizing agents) thus permitting multiple sanitizing applications from a single reclosure apparatus. It should also be appreciated that the sealed package 66 can be attached to the reclosure apparatus in many different ways. After said sanitizing agent 68 has been utilized said reclosure apparatus 10E the process of operating said reclosure will remain consistent with prior usage procedures.

Figure 14A:
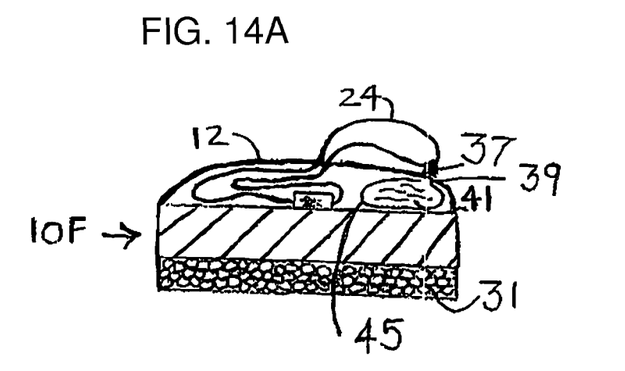
FIG. 14A is a side elevational view showing various layers of a package reclosure apparatus in accordance with a seventh embodiment of the invention.
Figure 14B:
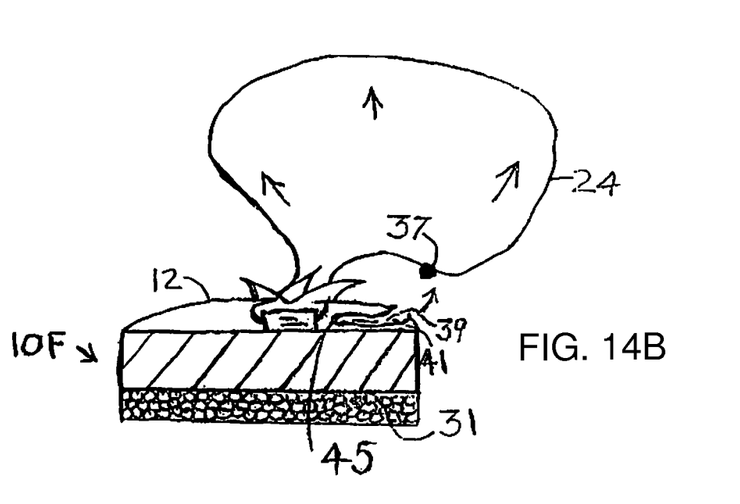
FIG. 14B is a perspective view of the package reclosure apparatus of FIG. 14A showing how consumer would access sanitizing element in accordance with one embodiment of the invention.

FIGS. 14A and 14B illustrate yet another embodiment of the invention. Referring now to FIG. 14A, an embodiment of a package reclosure 10F is shown. The reclosure apparatus 10F comprises a sealed package 45 containing a gel or liquid sanitizer 41. The sealed package 45 has an opening 39 on top layer 12. Opening 39 has a break away seal 37. Seal 37 has permanent attachment to elastomeric band 24. When elastomeric band 24 is extended for application, the temporary seal 37 will break away from opening 39, enabling sanitizer 41 to be released through opening 39 when pressure is applied to top layer 12 as illustrated in FIG. 14B. After said sanitizer 41 has been utilized said reclosure apparatus 10F the process of operating said reclosure will remain consistent with prior usage procedures.

Figure 15A:
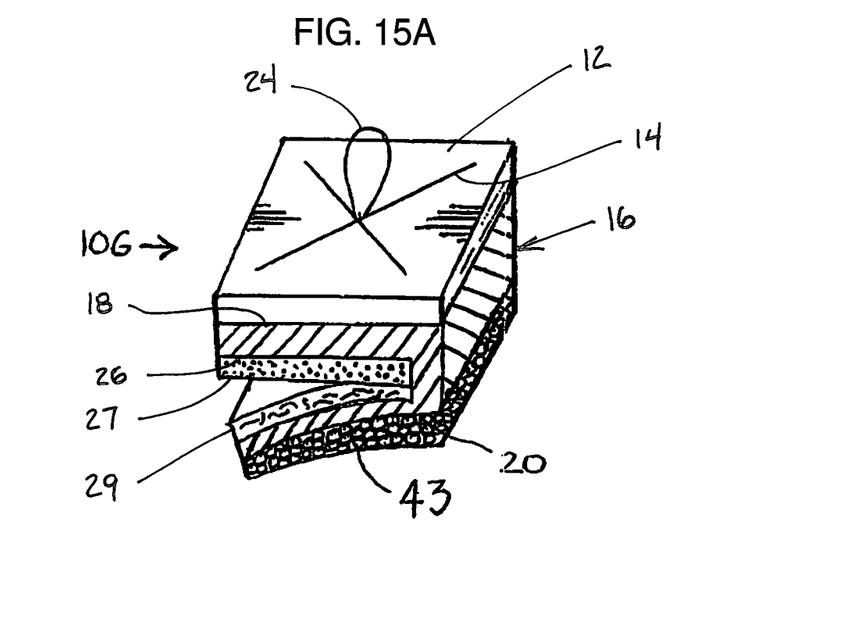
FIG. 15A is a perspective view showing various layers of a package reclosure apparatus in accordance with one embodiment of the invention.
Figure 15B:
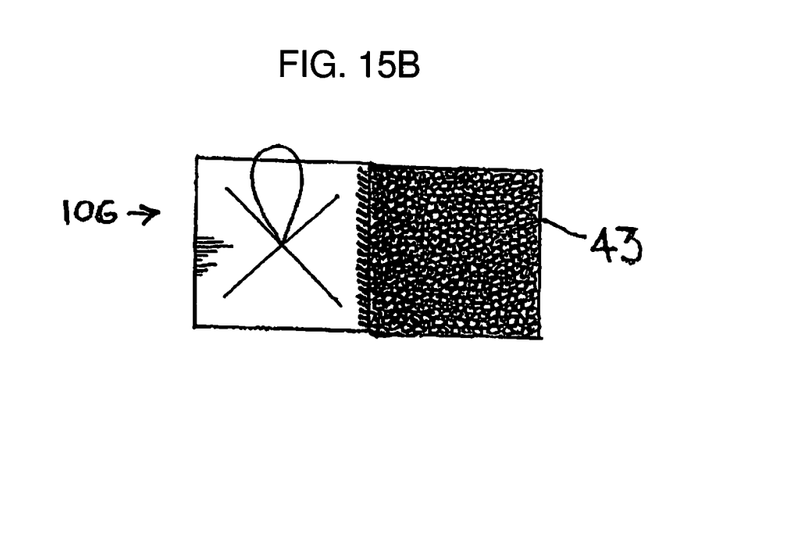
FIG. 15B is a top view of the package reclosure apparatus showing how consumer would access sanitizing element in accordance with one embodiment of the invention.

FIGS. 15A and 15B illustrate yet another embodiment of the invention. Referring now to FIG. 15A, an embodiment of a package reclosure 10G is shown. A base member 16 has a first surface 18 and a second surface 26. The first surface 18 is on an opposite side of the base member 16 from the second surface 26. The resilient expandable band 24 is coupled to and extends from the first surface 18 of the base member 16. The resilient expandable band 24 is at least partially enclosed by a top layer 12 coupled to the first surface 18 of the base member 16. An adhesive layer 27 includes a tacky adhesive and is coupled to the second surface 26 of the base member 16. A release liner 29 includes a release agent coated onto a portion of the second surface 26 of the base member 16. The release liner 29 is coupled to the adhesive layer 27 such that the release agent is in direct contact with the tacky adhesive of the adhesive layer 27. The release liner 29 is separable from the tacky adhesive. The reclosure apparatus 10G comprises a layer of sanitizer-containing pressure-rupturable microcapsules 43 contained on the first surface 18. Preferably, as shown in FIG. 15A, the microcapsules 43 are disposed on a lower portion 20 of the first surface 18. The sanitizer contained in each microcapsule is released for use when such microcapsule is ruptured under application of pressure by the users finger tip or by scraping with a device, such as a coin.

While various embodiments have been chosen to illustrate the invention, it will be understood by those skilled in the art that various changes and modifications can be made therein without departing from the scope of the invention as defined by the appended claims.

What is claimed is:

1. An attachable closure device, comprising:
    a base member having a first surface and a second surface, said first surface being on an opposite side of said base member from said second surface;
    a resilient expandable band coupled to and extending from said first surface of said base member, said resilient expandable band being at least partially enclosed by a top layer coupled to said first surface of said base member;
    an adhesive layer comprising a tacky adhesive, said adhesive layer coupled to said second surface of said base member; and
    a release liner sheet comprising a release agent coupled to said adhesive layer, such that said release agent is in direct contact with said tacky adhesive of said adhesive layer, said release liner sheet being separable from said tacky adhesive, said first surface of said base member having a releasable skin sanitizing agent coupled thereto.

2. The attachable closure device of claim 1, wherein said release agent is in a release layer supported by a release support layer.

3. The attachable closure device of claim 2, wherein said release support layer is unitary with said base member.

4. The attachable closure device of claim 1, wherein said resilient expandable band is partially visible.

5. An attachable closure device, comprising
    a base member having a first surface and a second surface, said first surface being on an opposite side of said base member from said second surface;
    a resilient expandable band coupled to and extending from said first surface of said base member, said resilient expandable band being at least partially enclosed by a top layer coupled to said first surface of said base member;
    an adhesive layer comprising a tacky adhesive, said adhesive layer coupled to said second surface of said base member; and
    a release liner comprising a release agent coated onto a portion of the second surface of said base member, said release liner being coupled to said adhesive layer, such that said release agent is in direct contact with said tacky adhesive of said adhesive layer, said release liner being separable from said tacky adhesive.

6. The attachable closure device of claim 5, wherein said resilient expandable band is partially visible.

7. The attachable closure device of claim 5, wherein the resilient expandable band is completely enclosed by said top layer.

* * * * *